United States Patent

Skillman

(10) Patent No.: US 8,167,102 B2
(45) Date of Patent: May 1, 2012

(54) CABLE SPOOL FOR CARRYING CONNECTIVITY CABLE FOR MOBILE COMPUTING DEVICES

(75) Inventor: Peter Skillman, San Carlos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 278 days.

(21) Appl. No.: 12/541,123

(22) Filed: Aug. 13, 2009

(65) Prior Publication Data

US 2011/0036676 A1    Feb. 17, 2011

(51) Int. Cl.
*B65H 75/44*    (2006.01)
(52) U.S. Cl. .................................................. 191/12.2 R
(58) Field of Classification Search ................. 191/12 R, 191/12.2 R, 12.4; 242/364, 370, 388.9, 398
See application file for complete search history.

(56) References Cited

U.S. PATENT DOCUMENTS

| | | | |
|---|---|---|---|
| 6,179,104 B1 * | 1/2001 | Steinmuller et al. ...... | 191/12.2 R |
| 6,253,893 B1 * | 7/2001 | Chi-Min ...................... | 191/12.4 |
| 6,616,080 B1 * | 9/2003 | Edwards et al. ............ | 242/378.1 |
| 7,438,258 B2 * | 10/2008 | Chen ............................. | 242/614 |
| 2006/0006038 A1 * | 1/2006 | Beverlin ................... | 191/12.2 R |
| 2006/0186255 A1 * | 8/2006 | Rooker ......................... | 242/395 |

* cited by examiner

*Primary Examiner* — S. Joseph Morano
*Assistant Examiner* — R. J. McCarry, Jr.

(57) ABSTRACT

A cable spool that has a body including a perimeter façade. An opening extends a thickness of the body. A track structure is formed with the perimeter façade to retain a cable. The opening is dimensioned to retain a terminal that connects to one end of the cable.

19 Claims, 16 Drawing Sheets

CABLE SPOOL FOR CARRYING CONNECTIVITY CABLE FOR MOBILE COMPUTING DEVICES

TECHNICAL FIELD

The disclosed embodiments relate generally to accessory devices for mobile computing devices. In particular, the disclosed embodiments include a cable spool for carrying a connectivity cable for a device.

BACKGROUND

Electronic devices can increase functionality by connecting to other devices. Many connectivity mediums enable two devices to transfer data and/or power. The use of connectors, such as USB connectors, has amplified issues with cable management. Connectivity cables can disorganize and diminish the use of electronic devices that use them to connect with other devices.

DETAILED DESCRIPTION

Disclosed embodiments include a cable spool for carrying a connectivity cables for electronic devices. In at least some embodiments, a cable spool is provided that has an opening for receiving or retaining a component that extends or connects to a cable. The cable in turn can be retained about a perimeter of the cable spool. In some implementations, the cable may be wound about the perimeter surface to retain the cable in a spooled position. While in the spooled position, the cable may be extended to mate with another component (e.g. power adapter) that is retained within the opening of the cable spool.

According to some embodiments, a cable spool includes a body with a perimeter façade. The body includes an opening that extends through the thickness of the body for purpose of retaining a power adapter or other component. The perimeter façade is provided as part of a track structure to retain a cable in a spooled position.

Still further, some embodiments include a cable spool assembly that comprises a cable spool and a power adapter. The power adapter is dimensioned to be retained and held by the cable spool.

Figure 1A:
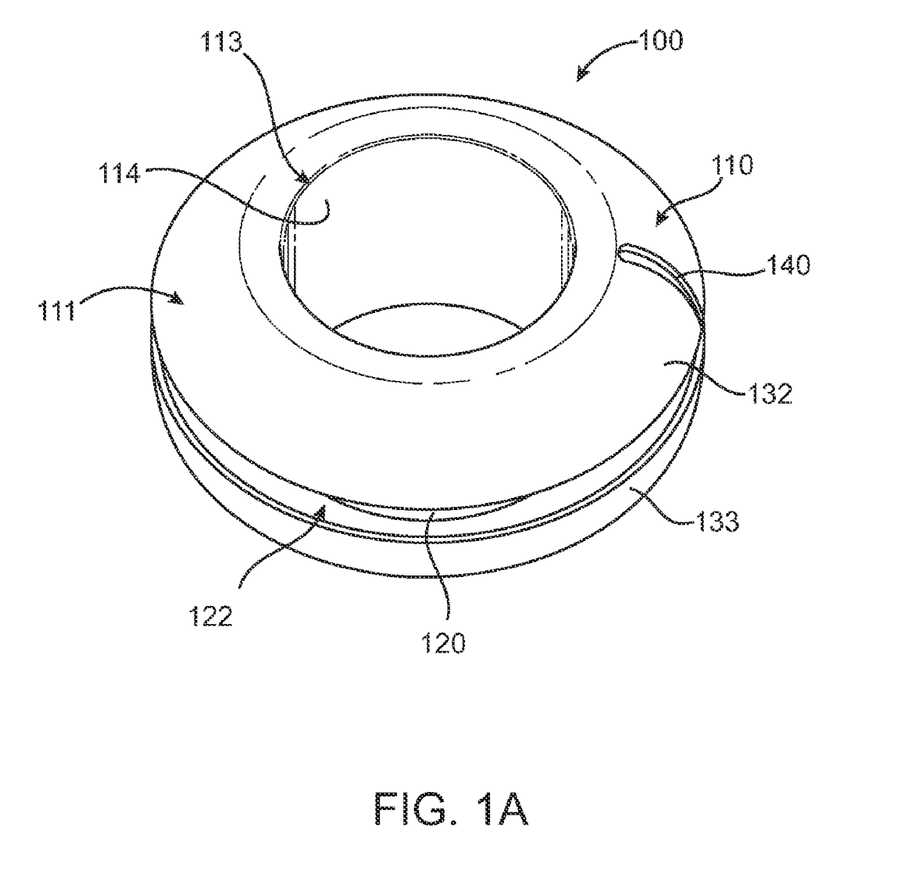
FIG. 1A is an isometric view of a cable spool, according to an embodiment.

FIG. 1A is an isometric view of a cable spool, according to an embodiment. The cable spool 100 includes (i) a body 110 that has a center portion 113 on which an opening 114 is formed, and (ii) a perimeter track structure 122 for retaining a cable. The opening 114 extends between the front façade 111 and the rear façade 141 (see FIG. 1B), so as extend completely through a thickness t (see FIG. 1C) of the body 110. As shown by FIG. 2 and elsewhere, the opening is dimensioned and shaped to snugly receive a compatible (by dimension and shape) power adapter 210 (or other terminal end of the cable). The track structure 122 includes a perimeter façade 120 that is partially enveloped on adjacent sides by flap extensions 132, 133. Each flap extension 132, 133 is an extension of a respective front and rear façade 111, 141 (see FIG. 1E).

In an embodiment, the front façade 111 includes notch 140 that enables one or both of the connector ends of the cable to be passed through. For example, as described with later embodiments, one end of the wound cable may be passed through the notch and mated with a compatible power adapter that is retained in the opening 114. Another end of the wound cable may be extended to a device that requires power from the wound cable.

The cable spool 100 may be formed from elastic material, such as rubber or plastic. In one implementation, the body's center portion 113 (excluding the flap extensions 132) is more rigid than the flap extensions 132, 133.

Figure 1B:
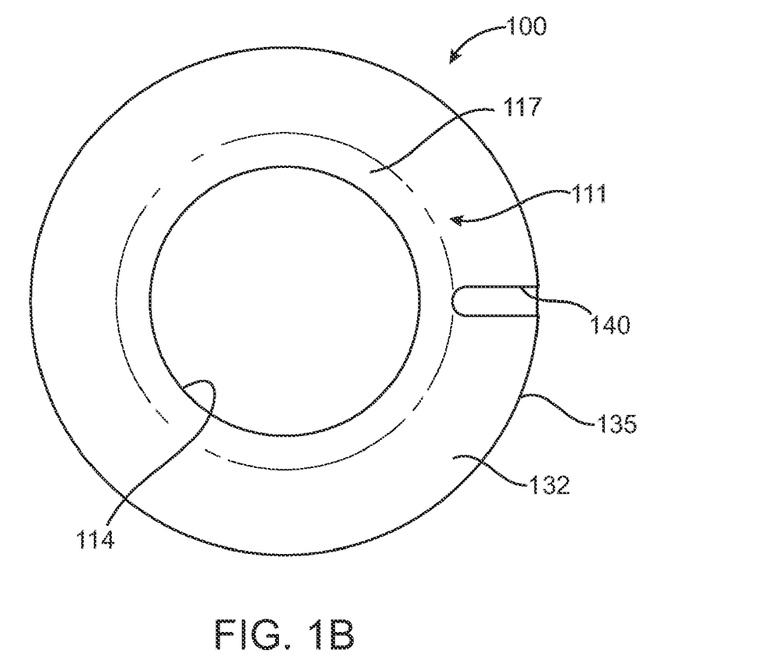
FIG. 1B is a front view of the cable spool.
Figure 2:
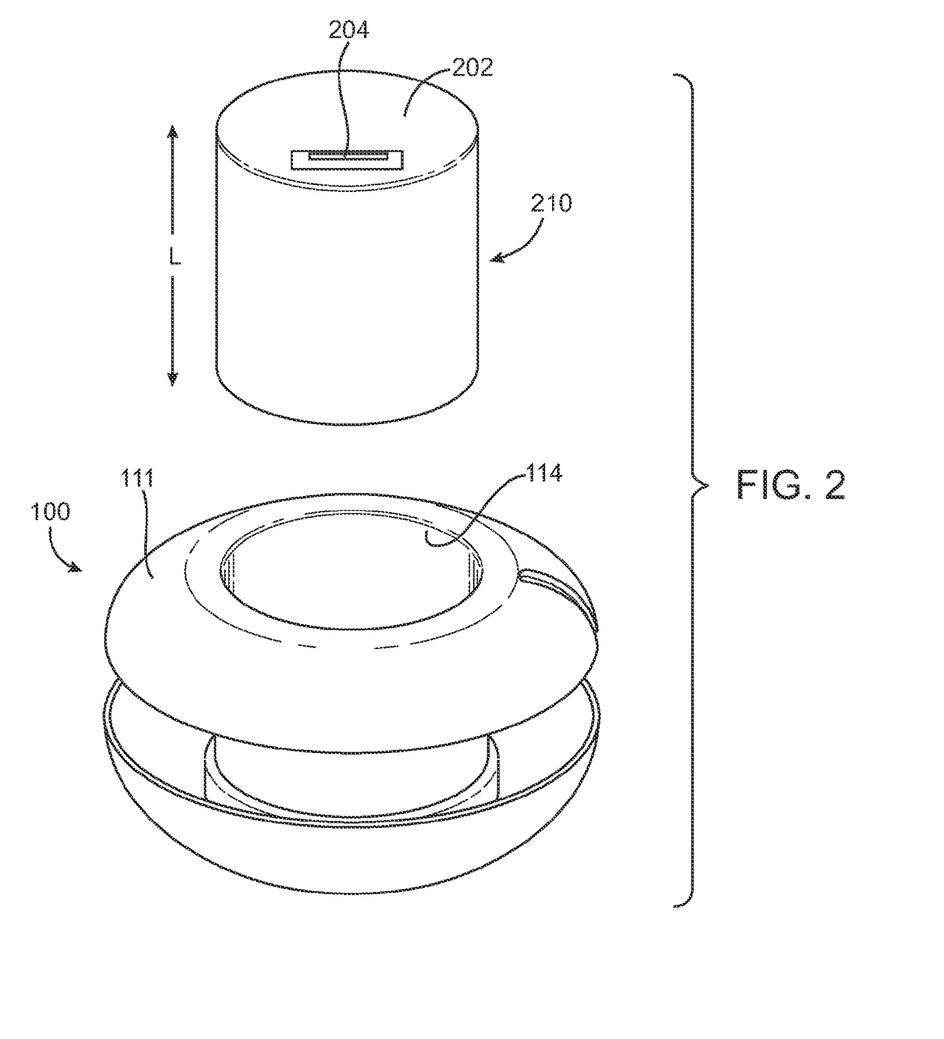
FIG. 2 is an exploded view of the cable spool retaining a compatibly shaped power adapter, according to one or more embodiments.

FIG. 1B is a front view of the cable spool 100. The front façade 111 of the spool 100 includes a front rim façade 117 that circumvents the opening 114, so as to form a relatively flat outer ring about the opening. The front rim façade 117 corresponds to a base of flap extension 132, which extend out into flap fold 135. The notch 140 extends partially into the front rim façade 117. The opening 114 is shown to be substantially circular, although alternative shapes (e.g. elliptical, rectangular) are possible.

Figure 1C:
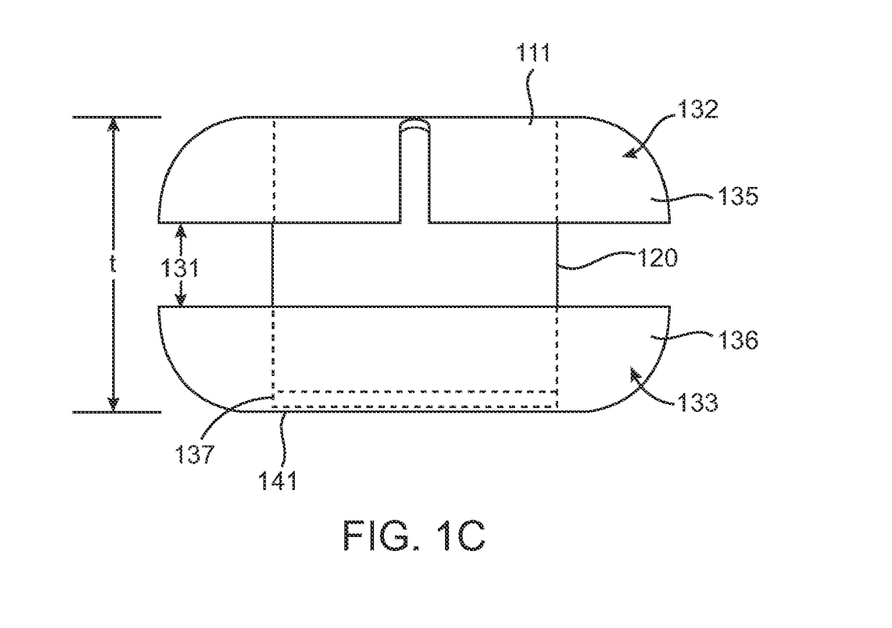
FIG. 1C is an end view of the cable spool.

FIG. 1C is an end view of the spool 100. As shown, each flap extension 132, 133 has a "mushroom cap" shape that stems over the perimeter façade 120. In this configuration, the flap extensions 132, 133 extend linearly a gap distance above the perimeter façade 120, before flap folds 135, 136 extend from respective front and back facades over the perimeter façade 120. The perimeter façade 120 is recessed and partially exposed between the flap folds 135, 136 of respective front and rear flap extensions 132, 133. A separation gap 131 between the flap folds 135, 136 provides spacing for the user to wind the cable about the perimeter surface 120. The thickness of the occupying cable is accommodated by the gap 131, and the flap folds 135, 136 serve as walls to retain the wound cable in the wound position. Depending on the length of the cable, the cable may be wound several times in order to be completely retained on the perimeter surface 120 about the center portion 113.

In one embodiment, the portion of the perimeter façade 120 adjacent the rear façade 141 is raised, to form a raised perimeter ring 137 (shown in FIG. 1C in phantom). The raised perimeter ring 137 forms a base in which the rear flap extension 133 is bi-stable, and reversible, in a manner such as described with FIG. 1F.

Figure 1D:
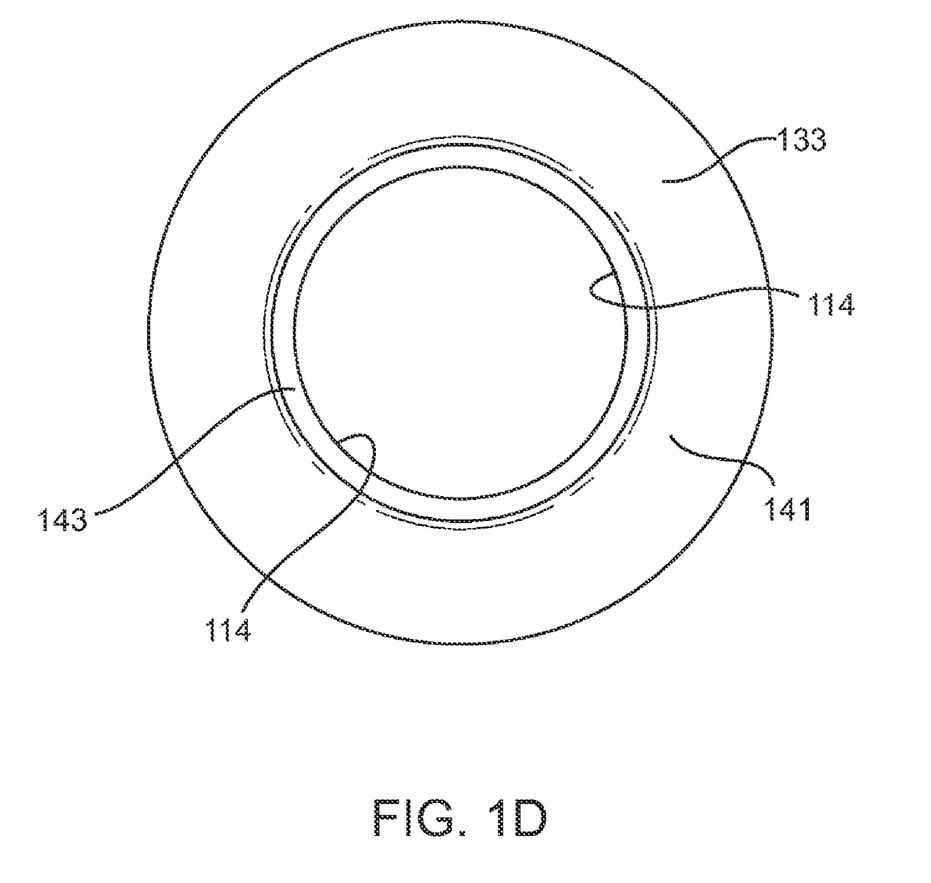
FIG. 1D is a rear view of the cable spool.

FIG. 1D is a rear view of the cable spool, according to an embodiment. In one embodiment, the rear façade 141 includes opening 114, a rear rim façade 143 and flap extension 133. According to one or more embodiments, the rear rim façade 143 is indented, or recessed relative to the remainder of the rear façade 141. The opening 114 extends completely through the center portion 113.

Figure 1E:
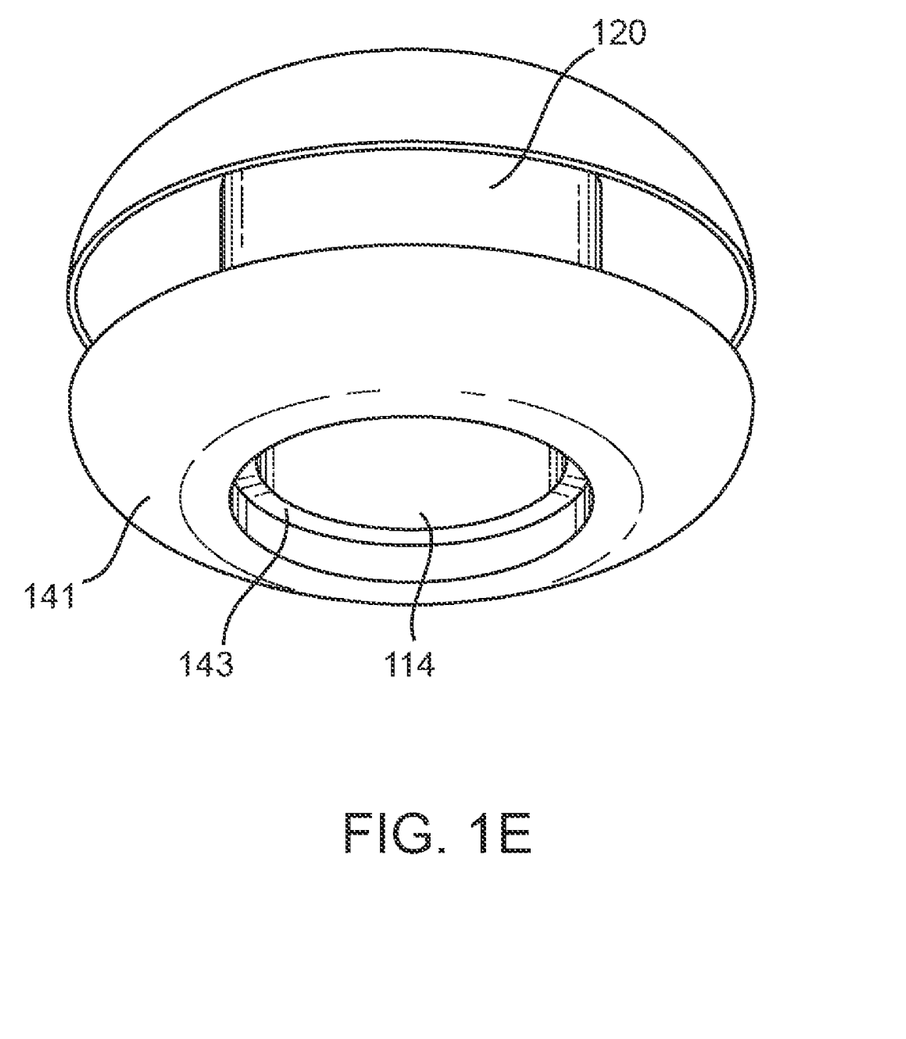
FIG. 1E is a rear isometric view of the spool.

FIG. 1E is a rear isometric view of the spool, according to an embodiment. The rear façade 141 is depicted with the rear rim façade 143 being sunken or recessed. This formation provides structure for the raised ring 137 (see FIG. 1C) on the adjoining portion of the perimeter surface 120. No notch or equivalent is depicted with the rear flap extension 133.

Figure 1F:
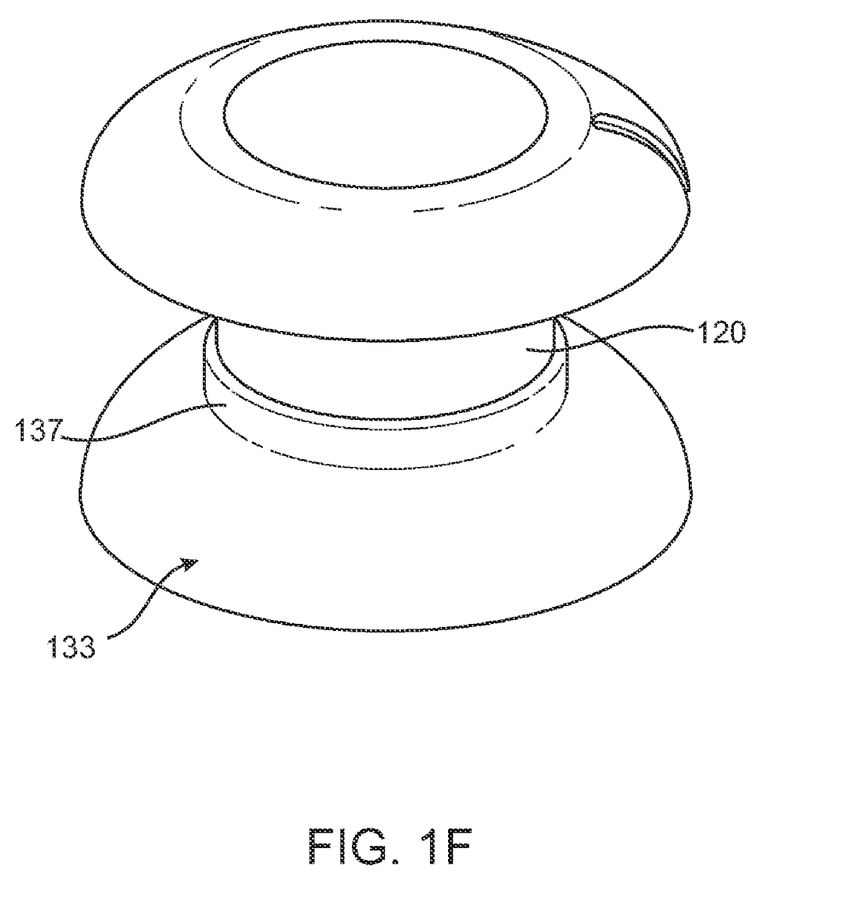
FIG. 1F illustrates an embodiment in which at least one of the flap extensions is bi-stable and reversible, according to an embodiment.

FIG. 1F illustrates an embodiment in which at least one of the flap extensions (shown to be rear flap extension 133) is bi-stable and reversible. In one embodiment, the portion of the perimeter façade 120 adjacent the rear façade 141 is raised, to form a raised perimeter ring 137 (shown in FIG. 1C in phantom). The raised perimeter ring 137 forms a base in which the rear flap extension 133 is bi-stable, and reversible, in a manner such as described with FIG. 1E.

Accordingly, as shown by FIG. 1F, one stable state of the rear flap extension 133 includes a mushroom cap formation that partially occludes the perimeter surface 120. FIG. 1F shows the flap extension 133 inverted, using the raised perimeter ring 137 as a support structure. The construction of the flap extension 133 may be such that the inverted position is also stable, thus creating a bi-stable flap extension. The rear flap extension 133 may be soft or flexible to enable the user to manipulate the rear flap extension 133 into the reverse orientation. The other flap extension 132 can optionally be similarly structured. In the configuration shown by FIG. 1F, raised ring 137 forms a base for the inverted flap extension 133. The user may reverse the rear flap extension 133 to access the cable about the center portion, or to wind/unwind the cable. Reversing the rear flap extension 133 may also form a stand for the spool 100.

FIG. 2 is an exploded view of the cable spool retaining a compatibly shaped power adapter, according to one or more embodiments. The opening 114 of cable spool 100 may be dimensioned and shaped to receive a similarly shaped power adapter 210. In the configuration shown, the power adapter 210 is cylindrical, and accommodated by the circular shape of the opening 114. In particular, the power adapter 210 is shaped to be snugly received in the opening 114. The power adapter 210 may include (i) a front façade 202 that includes connector 204 for receiving a cable; and (ii) a rear façade 212 shown in FIG. 3B that shows an outlet interface. The power adapter 210 is inserted so that the front façade 202 merges with the front façade 111 of the spool 100.

Figure 3A:
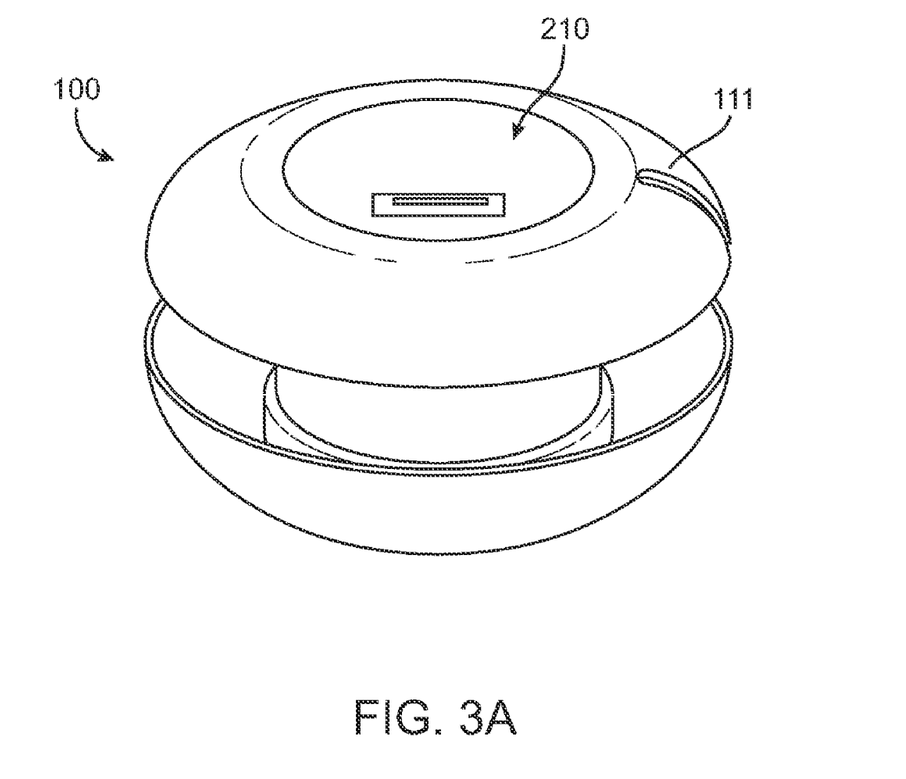
FIG. 3A and FIG. 3B illustrate a cable spool and a power adapter mated together, according to one or more embodiments.
Figure 3B:
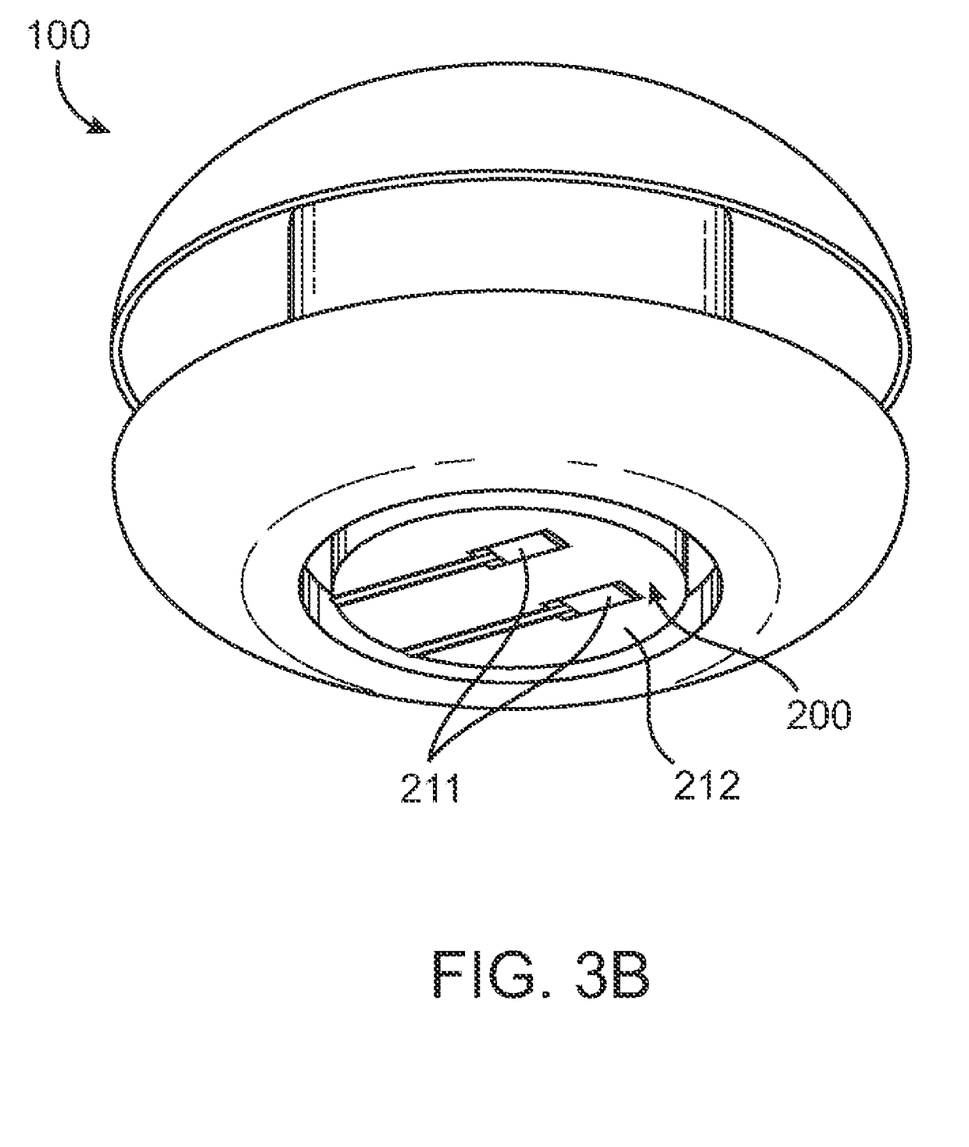

FIG. 3A and FIG. 3B illustrate the spool 100 and the power adapter 210 mated together. FIG. 3A is a front or top view of the combined devices, showing the power adapter 210 being dimensioned to be flush (or substantially flush) with the front façade 111 of the spool 100. In other words, a length L (FIG. 2) of the power adapter 210 substantially matches the thickness t (FIG. 1C) of the cable spool 100. In FIG. 3B, the rear façade 212 of the power adapter 210 is shown, illustrating tongs 211 that comprise the outlet interface. According to an embodiment, tongs 211 are retractable, such as described in Provisional U.S. Patent Application No. 61/142,172, entitled COMPACT POWER ADAPTER WITH INTERCHANGEABLE HEADS; the aforementioned application being hereby incorporated by reference in its entirety.

Figure 3C:
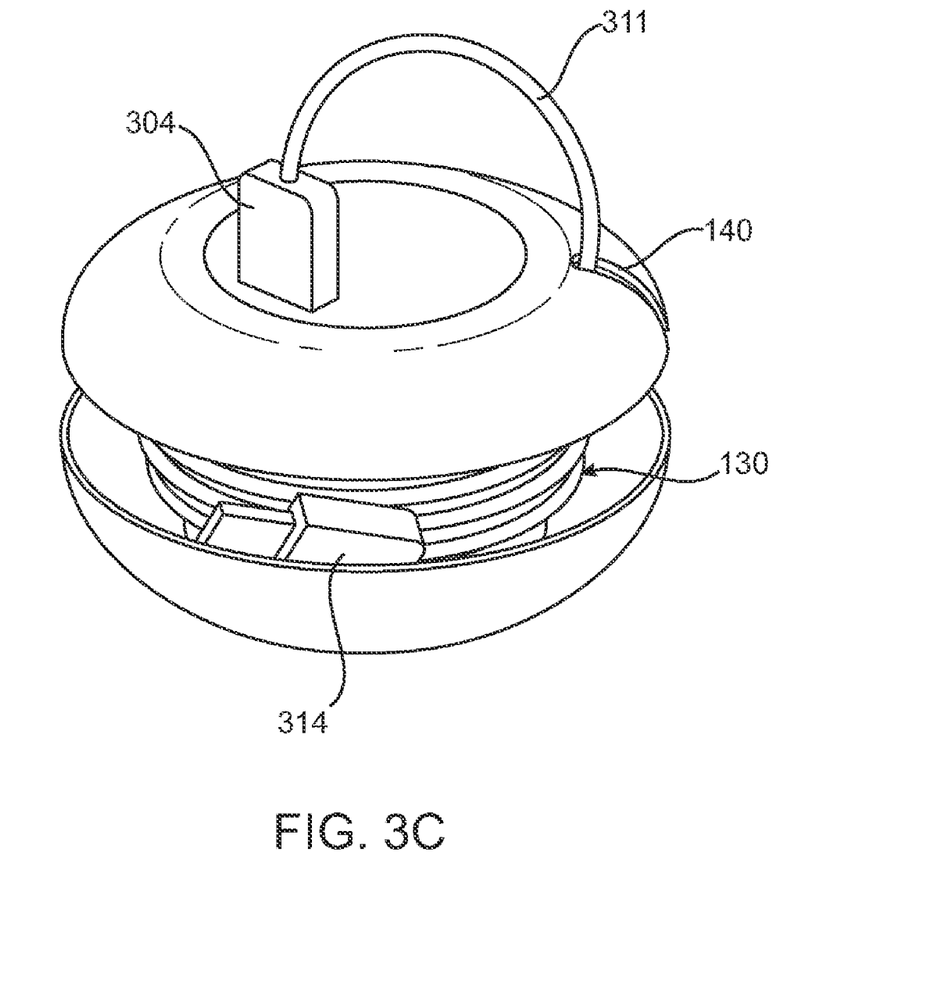
FIG. 3C and FIG. 3D illustrates a cable spool engaged with a power adapter and a cable, according to one or more embodiments.
Figure 3D:
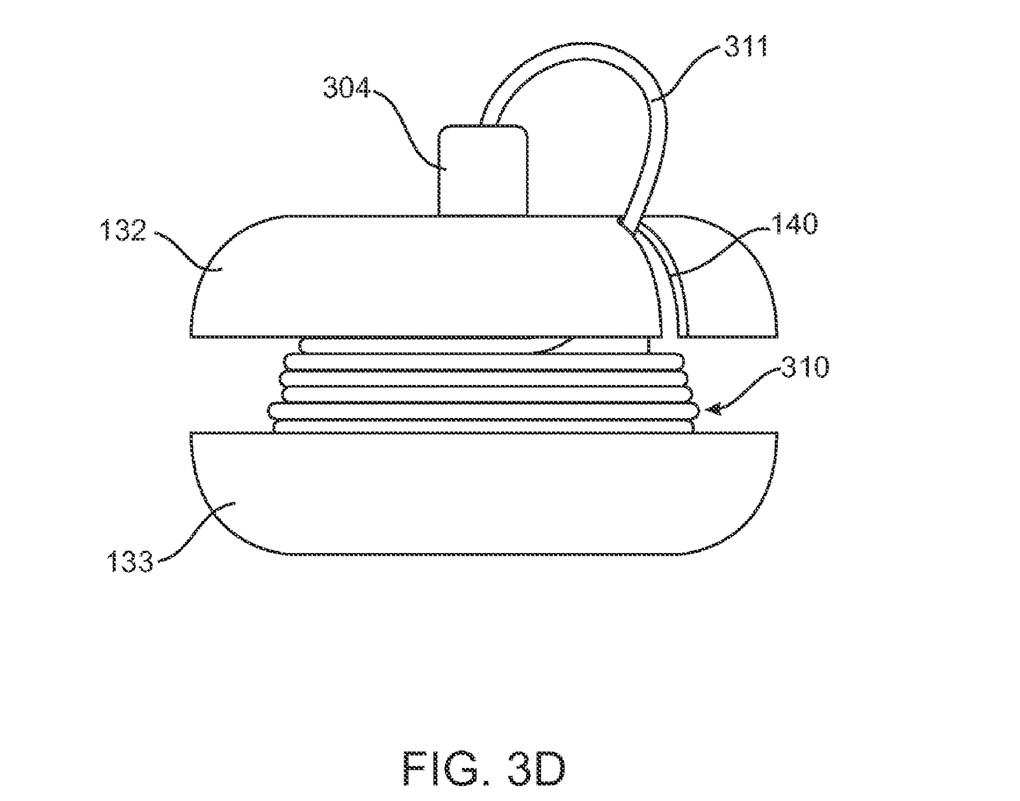

FIG. 3C and FIG. 3D illustrates the cable spool engaged with power adapter and a cable, under an embodiment. In an embodiment, a cable 310 is spun about the recess surface 120 (hidden) of spool 100, between flap extensions 132, 133. An end segment 311 of the cable terminates with connector 304, which mates with the connector 204 of the adapter 210. The end segment 311 of the cable 310 may be passed through notch 140 and reversed, so that its connector 304 mates with the connector 204 of the adapter 210. The cable terminates at another connector 314. The connectors 304, 314 may correspond to any form factor, such as plug (or alternatively receptacle) connectors conforming to the Universal Serial Bus standards (USB), including mini-USB, micro-USB form factors and Series A, B or AB types.

Figure 3E:
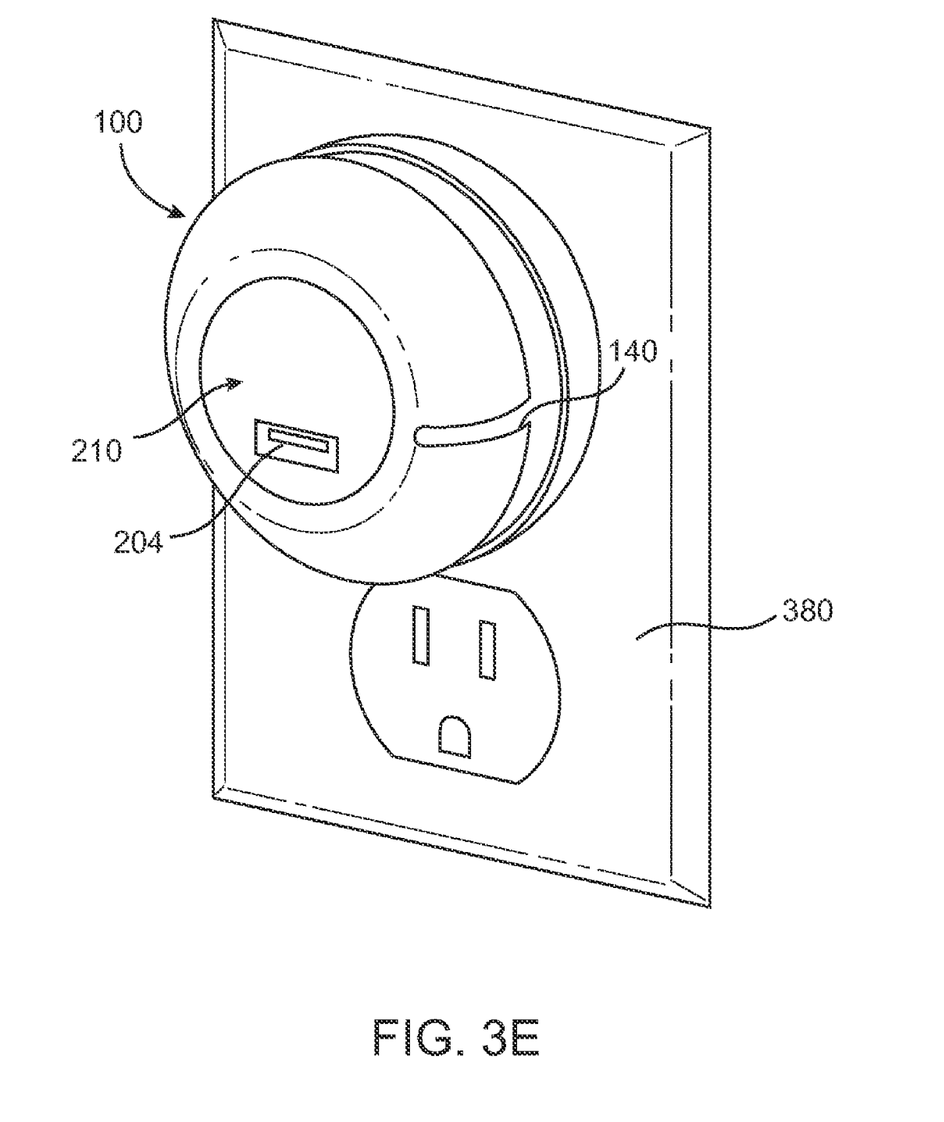
FIG. 3E illustrates a cable spool combined with a power adapter and engaged in a wall outlet, according to one or more embodiments.

FIG. 3E illustrates the cable spool 100 combined with the power adapter 210 and engaged in a wall outlet. The user may operate the spool 100 by extending the cable 310 (not shown in this figure) about the recess surface 120 (not shown in FIG. 3E) and extended through notch 140 to mate with the connector 204. Another end of the cable may be extended out to a computing device, such as a mobile computing device.

Figure 4:
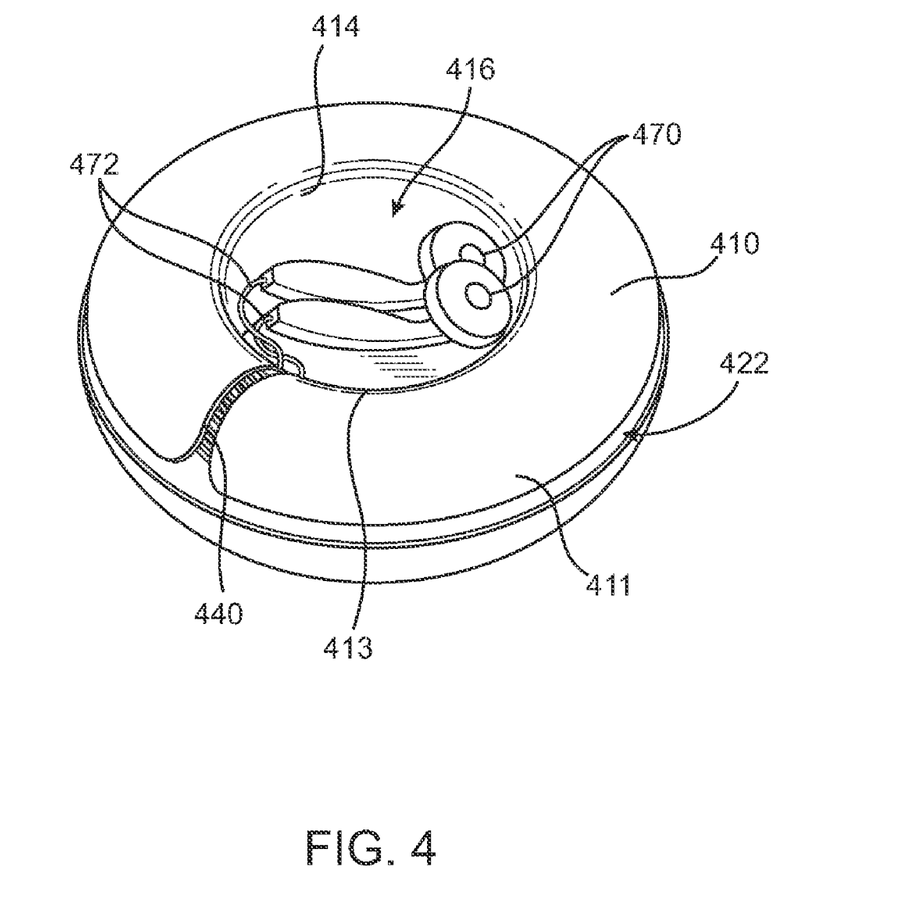
FIG. 4 is an isometric view of a cable spool according to another embodiment.

FIG. 4 is an isometric view of another cable spool, according to another embodiment. A cable spool 400 includes (i) a body 410 that has a center portion 413 on which an opening 414 is formed, and (ii) a perimeter track structure 422 for retaining a cable about a recessed surface 420 (see FIG. 5A). In an embodiment of FIG. 4, the opening 414 extends into, but not through, the front façade 411. In contrast to an embodiments described with FIG. 1A, for example, the opening 414 is not used to receive an adapter, but rather provides a containment area 416 that holds cable elements. In particular, one or more embodiments utilize cable spool 400 to retain earphones, and the cable elements retained in the containment area 416 correspond to the earpieces 470. The earpieces 470 extend into audio cables 472, which can be passed through the notch 440 and wrapped about the recess track 420 (see FIG. 5A) of the track structure 422. The perimeter façade 420 of track structure 422 is partially enveloped on adjacent sides by flap extensions 432, 433. Each flap extension 432, 433 is an extension of a respective front and rear façade 411, 441 (see FIG. 4 and FIG. 5C, respectively).

Figure 5A:
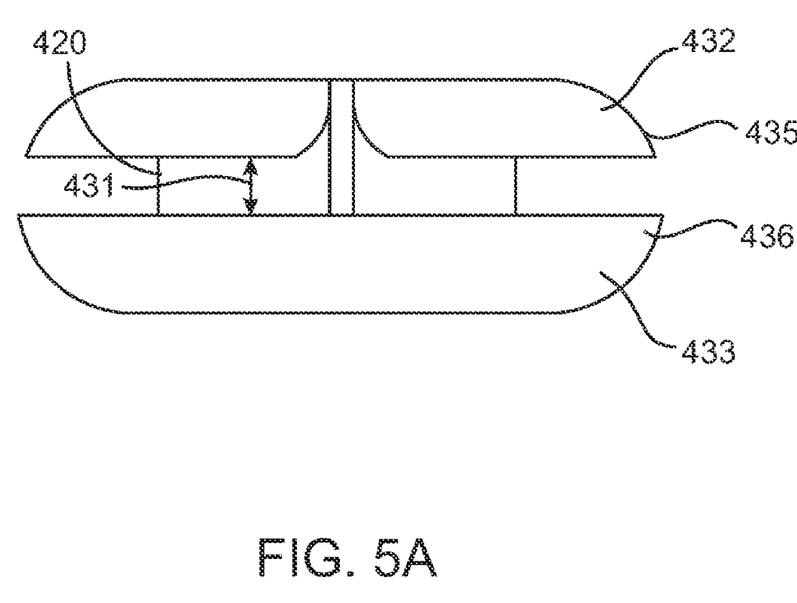
FIG. 5A is a side view of a cable spool of FIG. 4.

FIG. 5A is a side view of the cable spool 400, under an embodiment. Each flap extension 432, 433 has a "mushroom cap" shape that stems over the rear surface 420. In this configuration, the flap extensions 432, 433 extend linearly a gap distance above the perimeter façade 420. The perimeter façade 420 is recessed and partially exposed between the flap folds 435, 436 of respective front and rear flap extensions 432, 433. A separation gap 431 between the flap folds 435, 436 provides spacing for the user to wound the cable about the perimeter surface 420. The thickness of the occupying cable is accommodated by the gap 431, and the flap folds 435, 436 serve as walls to retain the wound cable in the wound position. Depending on the length of the cable, the cable may be wound several times in order to be completely retained on the perimeter surface 420, with cable elements (e.g. ear pieces) being contained in the containment area 416 (FIG. 4).

Figure 5B:
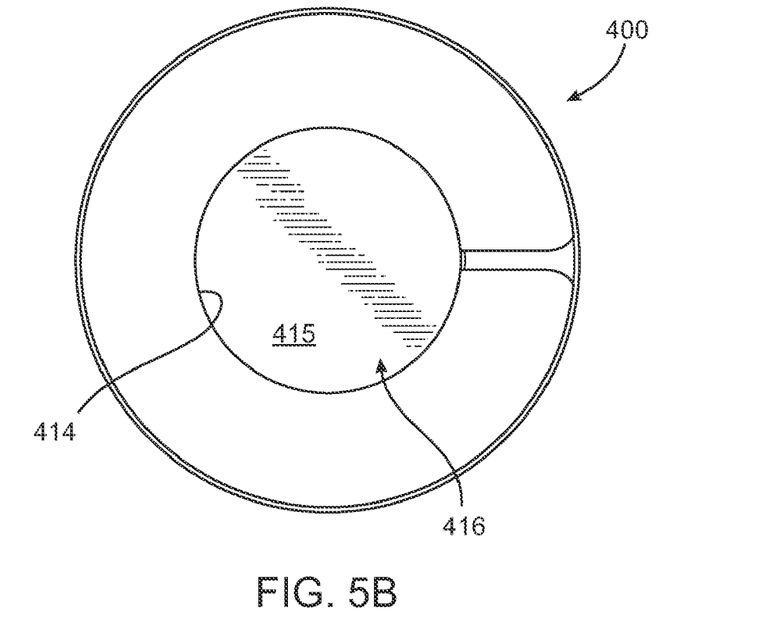
FIG. 5B is a front view of the cable spool of FIG. 4.

FIG. 5B is a front view of the cable spool 400, under another embodiment. The opening 414 includes platform 415 to define the containment area 416 for the earpieces (or other connector element).

Figure 5C:
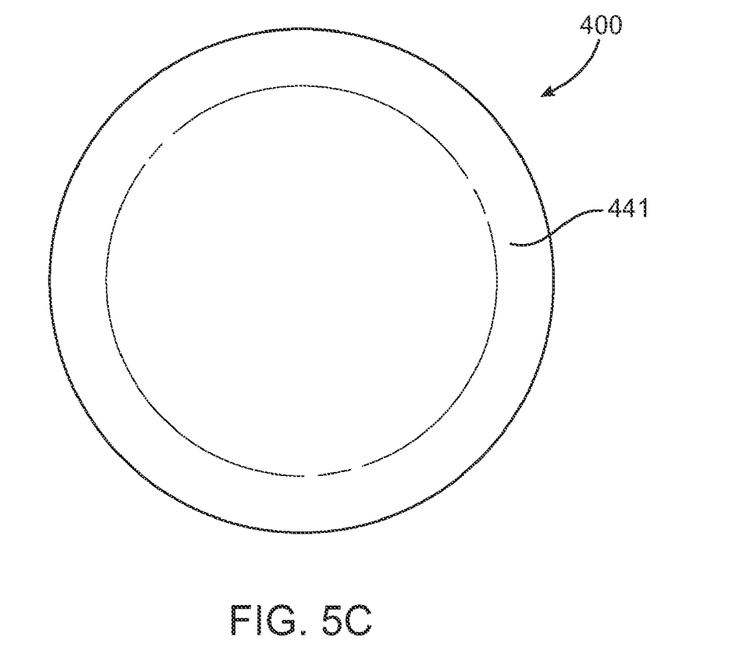
FIG. 5C is a rear view of the cable spool of FIG. 4.

FIG. 5C is a rear view of the cable spool 400, showing the rear façade 441. As mentioned, the opening 414 (FIG. 5B) does not extend through the cable spool 400.

Figure 6A:
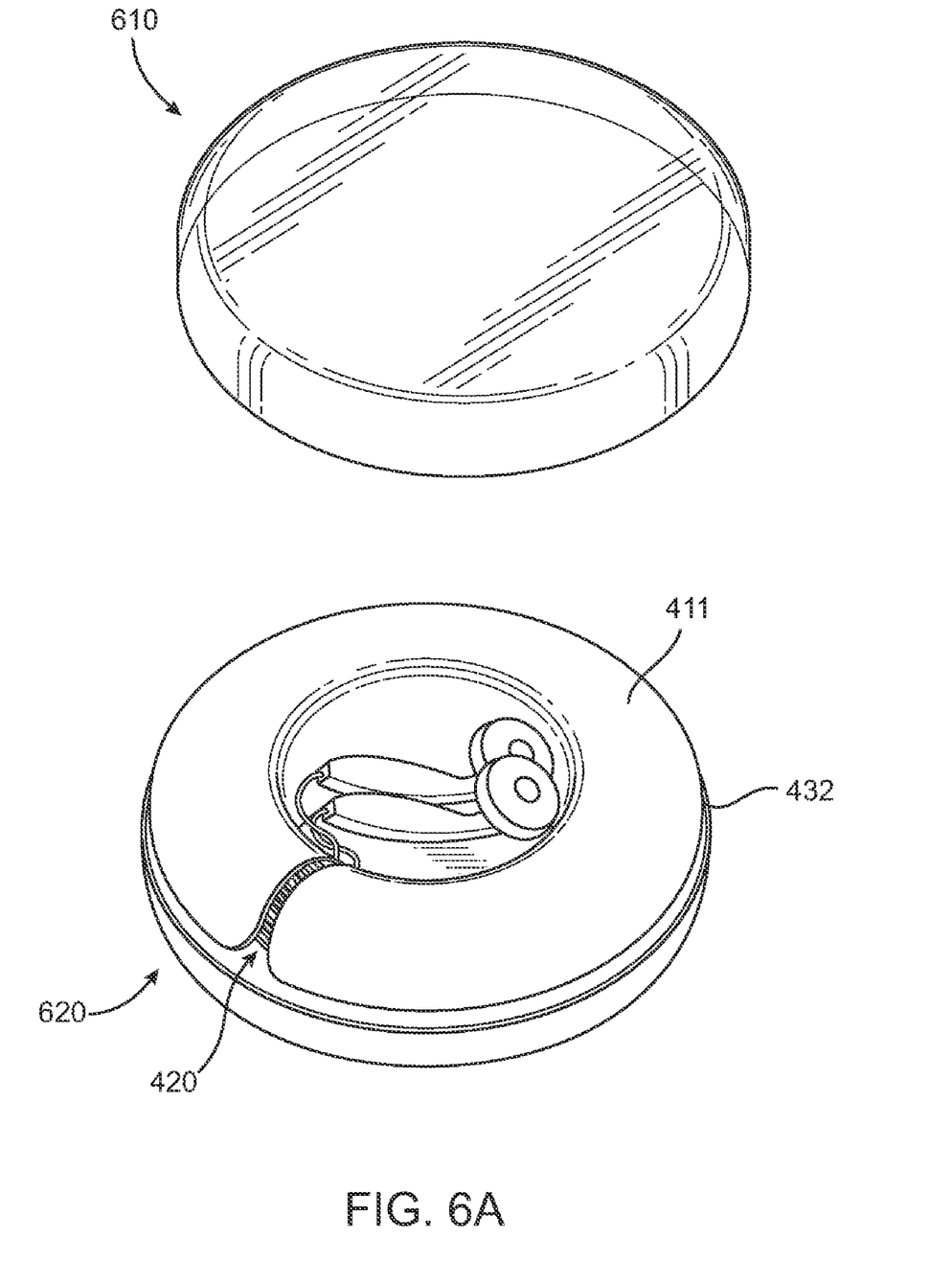
FIG. 6A and FIG. 6B illustrate a cable spool with a lid, according to one or more embodiments.
Figure 6B:
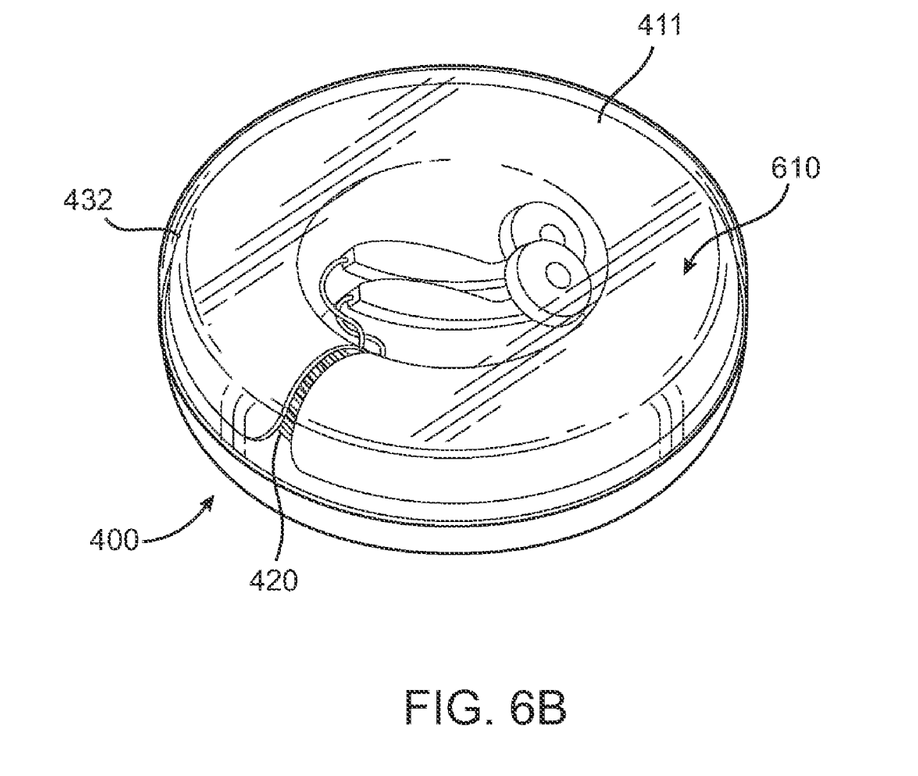

FIG. 6A and FIG. 6B illustrate a cable spool with a lid, according to one or more embodiments. A lid 610 is shown for use with cable spool 400. The lid 610 may be formed to be rigid, and so as to set on deformable or elastic body 410 of the spool 400. The lid 610 may also be translucent, such as provided by clear plastic. As shown by an embodiment of FIG. 6B, the lid 610 encapsulates or otherwise covers the front façade 411. Accordingly, the lid 610 is dimensioned to form fit over the front façade 411 and the flap extension 432, so as to at least partially extend over the perimeter recess 620.

In one embodiment, the lid 610 is affixed to a front segment 620 of the spool 400 (providing the flap extension 432 and front façade 411). The front segment 620 may be deformable and bi-stable, as described with other embodiments. The lid 610 may be affixed by compressing the front segment 620 and/or flap extensions 432.

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A cable spool comprising:
a body including a perimeter façade;
an opening that extends through a thickness of the body; and
a track structure formed in the perimeter façade to retain a cable;
wherein the opening is dimensioned to retain a terminal that connects to one end of the cable;
wherein the track structure comprises: (i) a pair of flap extensions that are provided on the perimeter façade, and (ii) a recessed formation provided between the flap extensions that retains the cable in between the pair of flap extensions; and
wherein the pair of flap extensions are flexible and positionable in an extended position or contracted position, wherein in the extended position, the flap extensions include an additional length that extends vertically from the perimeter façade.

2. The cable spool of claim 1, wherein the track structure includes a notch, the notch being positioned and dimensioned to enable the cable to pass through the notch.

3. The cable spool of claim 2, wherein the notch is oriented to align with a front façade of the body.

4. The cable spool of claim 1, wherein the body and the opening are circular.

5. The cable spool of claim 1, wherein each of the pair of flap extensions is bi-stable to bias into the extended position or the contracted position, depending on manipulation by a user.

6. The cable spool of claim 5, wherein the pair of flap extensions are formed from elastic material.

7. The cable spool of claim 1, wherein the opening is dimensioned to receive a power wall adapter.

8. The cable spool of claim 1, wherein the opening is dimensioned to receive a circular power wall adapter.

9. A cable spool assembly comprising:
a body including a perimeter façade;
an opening that extends through a thickness of the body;
a track structure formed in the perimeter façade to retain a cable; and
a power wall adapter with a plug extension;
wherein the opening is dimensioned to retain the power wall adapter;
wherein the track structure comprises: (i) a pair of flap extensions that are provided on the perimeter façade, and (ii) a recessed formation provided between the flap extensions that retains the cable in between the pair of flap extensions; and
wherein the pair of flap extensions are flexible and positionable in an extended position or contracted position, wherein in the extended position, the flap extensions include an additional length that extends vertically from the perimeter façade.

10. The cable spool assembly of claim 9, wherein the opening is dimensioned to snugly retain the power wall adapter when the power wall adapter is plugged into an electrical outlet.

11. The cable spool assembly of claim 9, wherein the power wall adapter and the opening are both circular.

12. The cable spool assembly of claim 9, wherein the power wall adapter includes a port to receive a connector end of the cable.

13. The cable spool of claim 9, wherein each of the pair of flap extensions is bi-stable to bias into the extended position or the contracted position, depending on manipulation by a user.

14. The cable spool of claim 13, wherein the pair of flap extensions are formed from elastic material.

15. A cable spool assembly comprising:
a body including a perimeter facade;
an opening that extends through a thickness of the body;
a track structure formed in the perimeter façade, the track structure including a notch;
a power wall adapter with a plug extension;
a cable that is matable with the power wall adapted on one end, and with a mobile computing device on another end;
wherein the opening is dimensioned to retain the power wall adapter;
wherein the track structure is dimensioned to retain the cable, the notch being positioned to enable the cable to pass through the notch while the cable is mated with the power wall adapter;
wherein the track structure comprises: (i) a pair of flap extensions that are provided on the perimeter façade, and (ii) a recessed formation provided between the flap extensions that retains the cable in between the pair of flap extensions; and
wherein the pair of flap extensions are flexible and positionable in an extended position or contracted position, wherein in the extended position, the flap extensions include an additional length that extends vertically from the perimeter façade.

16. The cable spool of claim 15, wherein the body and the opening are circular.

17. The cable spool of claim 15, wherein each of the pair of flap extensions is bi-stable to bias into the extended position or the contracted position, depending on manipulation by a user.

18. The cable spool of claim 15, wherein the pair of flap extensions are formed from elastic material.

19. The cable spool of claim 15, wherein the power wall adapter is in a circular or cylindrical shape.

* * * * *